Jan. 11, 1955
E. B. ANDER
2,699,317
VALVE
Filed Aug. 21, 1952
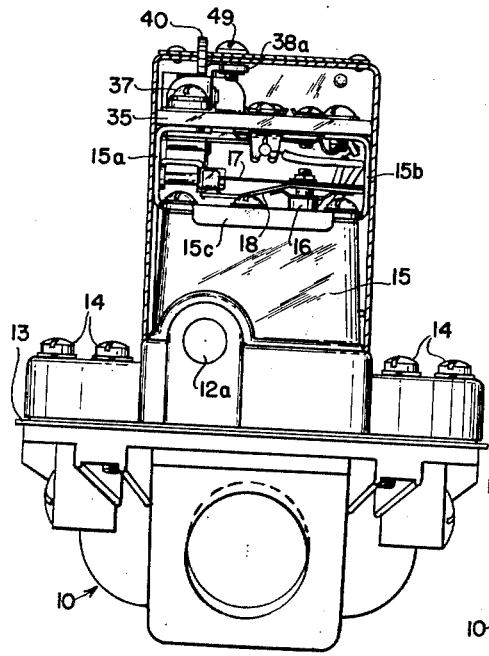
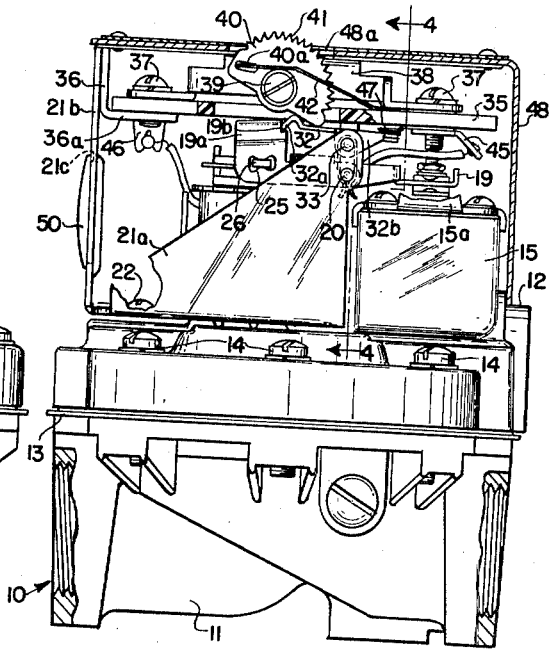
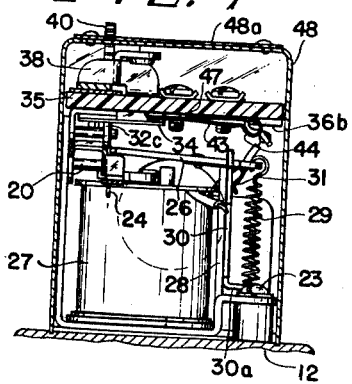
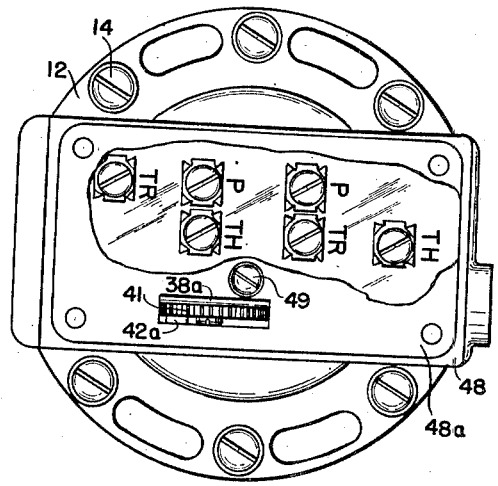
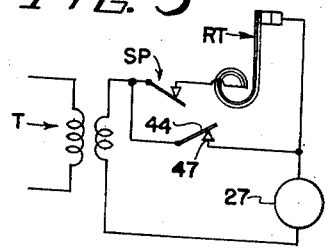
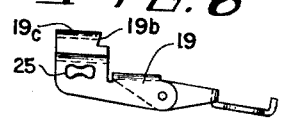
INVENTOR.
ERIC B. ANDER
BY George H. Fisher
ATTORNEY

United States Patent Office 2,699,317
Patented Jan. 11, 1955

2,699,317
VALVE

Eric B. Ander, Minneapolis, Minn., assignor to Minneapolis-Honeywell Regulator Company, Minneapolis, Minn., a corporation of Delaware Application August 21, 1952, Serial No. 305,675

9 Claims. (Cl. 251—68)

This invention relates to power operated valves generally and, more specifically, to power operated valves having means for manually actuating the valve in the event of power failure.

Valves of the above mentioned type are well known in the art, particularly in the fuel burning art wherein a fuel valve is controlled by a thermostatic device to maintain a desired temperature in a space heated by a fuel burner. Where the power means for the valve is electricity, it is customary to provide a manual means for actuating the valve to its open position in the event of a power failure. Also, in such a valve, it is customary to provide means for automatically returning the valve to the control of the thermostatic means upon power resumption. The advantage of such an arrangement is two fold; with the valve under the control of the thermostat, the fuel will be shut off when the desired temperature is reached. Secondly, if the valve remains open under the control of the manually actuating means, it will be necessary for the operator to closely watch the temperature to determine when the fuel should be cut off and, should the operator fail to note the fact that the temperature has reached the desired temperature, an undesirable if not dangerous temperature increase may take place, in addition to the wasteful burning of fuel.

Prior art devices which provide "automatic recycling" of a fuel valve, from manual operation to thermostatic control, have been quite erratic in their performance. This is in part due to the fact that the means for holding the valve in its operating position during power failure is easily jarred out of operating or holding position. Also, the means that usually projects out of the valve cover for manual engagement is susceptible to accidental releasing of the manual actuating means for the valve should someone or something accidentally brush against it.

It is one of the objects of this invention to overcome the above mentioned difficulties experienced by prior art devices of the above mentioned type.

Another object of the invention is to provide a manually operable latching mechanism, for actuating an automatically recycling valve, which will withstand considerable vibration without jarring out of valve open position as to cause the valve to return to the control of the thermostat prematurely.

Still another object of the invention is to provide an automatically recycling valve wherein the manually operable means projects through the valve cover and is subject to considerable movement in the valve closing direction before it will cause closing of the valve.

Another object of the invention is to provide a manual actuator for an automatically recycling valve wherein a pivoted member is movable in one direction to actuate a latch against a valve actuating lever and to hold said latch in its valve open position and, movable in the opposite direction to engage the lever to release the latch and thus enable the lever to return to its valve closed position.

Still another object of the invention, is to provide in an automatically recycling valve, a manually operable mechanism exposed to the exterior of the valve housing and is normally biased by a weak spring into engagement with a latching member so as to require considerable movement of said member in the opposite direction to cause release of the latch and closing of the valve, due to considerable lost motion between said member and the member actuated thereby.

Still another object of the invention is to provide a mechanically operated mechanism in a recycling valve which requires very little force to manually open and latch the valve and to release the latching mechanism, yet tightly holds the valve actuating means in its open position.

Other objects of the invention will become apparent upon reading the following detailed description of the invention in conjunction with the accompanying drawing wherein:

Figure 1 is a side elevational view of a diaphragm valve embodying the invention, with portions thereof broken away;

Figure 2 is an end view with a portion of the cover removed;

Figure 3 is a plan view of the valve with a portion of the cover broken away;

Figure 4 is a cross-sectional view taken along line 4—4 of Figure 1;

Figure 5 is a circuit diagram for the valve; and

Figure 6 is a detailed view of a motion transmitting lever.

In the drawing, the numeral 10 generally designates the valve body of a conventional diaphragm valve formed of a lower casting 11, an upper casting 12 and with a diaphragm 13 therebetween. The diaphragm is tightly clamped between the upper and lower castings by means of bolts 14 extending through the upper casting and screwthreaded into the lower casting.

Formed as an integral part of the upper casting is the body 15 of a three-way pilot valve or diaphragm controller. The details of this diaphragm controller, as well as the details of the diaphragm valve, form no part of this invention so there is no necessity to elaborate on said details other than to state that they may consist of any of the conventional and well known valves of this type. A three-way valve head (not shown) within the body 15 is connected to the stem 16, which, in turn, is connected to a horizontally extending resilient arm 17 and a relatively stiff arm 18 offset transversely from the arm 17 at the left hand ends thereof, as viewed in Figure 2 of the drawing. This three-way valve is adapted to be actuated to a position to cause opening of the diaphragm valve by upward movement of the end of a lever 19 positioned between the spaced ends of arms 17 and 18. Downward movement of the end of lever 19 causes downward movement of the end of arm 18. Downward movement of arm 18 causes stem 16 to shift to position the three-way valve to cause closing of the diaphragm valve and also causes the end of arm 17 to move down.

The lever 19 is generally channel-shaped intermediate its ends and is pivoted on a pivot 20 extending through the side walls of the lever and secured to a mounting bracket 21a, which, in turn, is secured to the top casting 12 by screws 22 and 23. The lever 19 is retained on the pivot 20 by means of a spring clip 24 positioned in an annular groove near the inner end of the pivot. The left hand end of the lever 19 is slotted at 25 to receive the end of an armature 26 to be presently described. Extending upwardly above the slot 25 is a vertical wall portion 19a having a notch 19b therein for the reception of a latch member to be presently described. Extending laterally from the upper end of the wall 19a, is an arm 19c for a purpose to be hereinafter described.

The armature 26, the end of which projects through the slot 25 in the lever 19, is positioned above an electromagnet 27 and is pivotally connected to the upper end of an L-shaped bracket 28 on which the coil is mounted. The L-shaped bracket is in turn secured to the bracket 21a by any suitable means, such as by welding. The armature 26 is biased away from the magnet 27 by means of a coil tension spring 29 connected to the extreme end of the pivoted end of the armature 26 and a laterally extending arm 30a of a pivot perforating member 30 secured to the L-shaped bracket 28. Apertures in a thin metallic member 31, which is riveted to the underside of the armature 26, cooperate with the upper end of bracket 28 and the pivot member 30 to hold the armature 26 in proper pivotal relationship with respect to the coil 27 and the slot 25 in the lever 19.

Positioned above and extending generally parallel with the lever 19, is a latch lever 32 having an upwardly arched end 32a which is adapted to engage and latch against the wall portion of a notch 19b in the lever 19. The intermediate portion of the lever has downwardly extending arms 32b and 32c which are apertured to receive a pivot 33 extending transversely from the bracket 21a above the pivot 20. The latch lever 32 is retained on the pivot 33 by means of the same spring clip 24 that retains the lever 19 on the pivot 20. Secured to the other end of the latch 32, by means of rivets, is a transversely extending arm 34 of suitable insulating material, such as Bakelite, for a purpose to be presently described.

Positioned over the above mentioned pilot valve, electromagnet and levers, is a terminal plate 35 made of Bakelite or other suitable insulating materials. This plate rests on transversely extending arms 36a and 36b of a plate 36 welded or otherwise secured to the bracket 21a and on vertically and transversely extending, L-shaped arms 15a and 15b of the cap 15c for the pilot valve 15. The terminal plate is secured to the arms 36a, 15a, and 15b by means of screws 37.

Mounted on the top surface of the terminal plate 35, generally above the levers 19 and 32, is a bracket member 38. This bracket is rigidly secured to the plate 35 by the same screws 37 as secure the plate 35 to the arms 36a and 15b. Pivotally mounted on a vertically extending wall portion of the bracket 38, by means of a full pivot 39 screwthreaded into the bracket 38, is a half-disc member 40 having a knurled portion 41 along the arcuate edge thereof. The right hand end of the disc 40, as viewed in Figure 1 of the drawing, normally bears against the uppermost portion of the bent end 32a of latch lever 32. This normal engagement of the disc 40 with the latch member is caused by a light weight leaf spring 42 anchored at its right hand end, as viewed in Figure 1, between the bracket 38 and the terminal plate 35. The left hand end of the leaf spring 42 is vertically offset from the right hand end and has a transversely extending arm 42a (Fig. 3) that engages in a slot 40a in the left hand side of the disc 40. The bias of the spring 42 is just sufficient to normally hold the disc against the latch lever, without causing any movement of said latch lever.

Extending through a central position of the terminal plate are two adjacent terminal clips P and TR which are riveted to a common plate 43 positioned on the underside of the terminal plate 35. Clamped between this plate 43 and the plate 35 is a transversely extending portion of a movable spring contact arm 44. The free end of this contact arm engages the upper surface of the free end of the insulation arm 34 on the latch lever 32 to normally hold the end 32a of said latch lever in a raised position out of engagement with the notch 19b of lever 19. Also extending through the right hand end portion of the insulation terminal plate 35 is a single terminal member, marked TH in the drawing, that is secured to a lead terminal plate 45 located under the plate 35. Tightly clamped between the plate 45 and the plate 35 is a relatively fixed contact arm 47 that is adapted to be engaged by the movable contact arm 44 when it is moved upwardly by upward movement of the arm 34. The reason for this arrangement will be discussed hereinafter.

One of the leads from the magnet coil 27 extends to the lead plate 45 where it is soldered. The other lead from the coil is soldered to lead plate 46 which is secured to a terminal clip TR extending through the other end portion of the plate 35. In the showing of Figure 1, the terminal clip TR lies directly behind screw 37 and is hidden from view by said screw. Extending through the central portion of the plate 35 between the TH clip and the P and TH clips, is another pair of terminal clips marked P and TH, which are secured to a common plate (not shown) on the underside of the plate 35.

A cover 48 is held in place over the valve actuating mechanism described above by means of a screw 49 extending through an aperture in the cover and screwthreaded into a threaded aperture in the arm 38a of the bracket 38. The cover has a slot 48a therein, through which a small portion of the disc 40 extends for manual actuation thereof.

An aperture 21c in the wall 21b of bracket portion 21a, which is shown in Figure 1 as being sealed with a rubber plug 50, is adapted to receive a conduit coupling (not shown) through which leads of a control system (schematically shown in Figure 5 of the drawing) may extend and be connected to the terminals on top of the terminal plate 35.

*Operation*

With the above described power valve installed in a heating system to control the flow of fuel to the furnace and with the valve wired as shown in Figure 5, that is, with the lead wires from the secondary of the transformer T connected to the terminals marked TR in Figure 3 of the drawing, with additional leads extending from the movable contact and the fixed contact of a conventional safety pilot switch, indicated by the letters SP in the drawing, and with the terminals TR connected to the fixed and movable contacts of a room thermostat RT, the furnace will be in operation. The valve is shown in its open position due to the fact that the disc 40 has been rotated clockwise to position the latching lever 32 against the lever 19, which holds the three-way pilot valve in a position to bleed gas from above the diaphragm through bleed port 12a in the casting 12 and at the same time shutting off gas flow from the inlet of the valve to the space above the diaphragm. In this position of the elements, the bias of spring 29 on the armature 26 tends to move the lever 19 in a clockwise direction, as viewed in Figure 1, and wedges the end 32a of the latch lever 32 against the wall of the notch 19b thus preventing said latch 32 from lifting out of the notch and permitting the valve to close. Also, with the parts so positioned, the arm 34 is overpowering the movable contacts arm 44 and holding it against the fixed contact 47, completing a circuit directly between the coil of the electromagnet and the secondary of the transformer.

When current is supplied to the primary of the transformer, either initially or after power failure, the electromagnet will pull the armature 26 and the left hand end of the lever 19 downwardly an additional distance to disengage the notch 19b from the end 32a of the latch lever 32. When this happens, the bias of contact arm 44 will force the latch lever in a clockwise direction to position said end 32a out of possible engagement by the lever 19 and to cause the contact arm 44 to disengage from the fixed contact 47. This places the valve under the control of the room thermostat and the safety pilot switch that is normally held in its closed position by the presence of a pilot burner flame adjacent the main burner of the furnace, in a manner well known in the art.

Should there be no power initiation or resumption, the valve may be caused to shut down by manually rotating the member 40 in a counter-clockwise direction to bring the left hand end of the member into engagement with the top surface 19c of the lever 19 to move said lever 19 an additional distance downwardly, as in the case of power resumption, to free the latch 32 for clockwise movement as in the case of power resumption. The additional travel for the lever 19 is permitted by the resilient arm 17 on the pilot valve bending slightly as the engaging portion of the lever 19 moves upwardly said additional distance beyond the normal limit of movement of the pilot valve. There is quite a bit of lost motion between the member 40 and the lever surface 19c so as to permit a certain amount of accidental movement of the member 40 in the latch tripping direction before the latch is actually tripped. This materially reduces the possibility of the valve being accidentally closed by someone or something brushing against the valve. The light spring 42 assures this lost motion movement by normally holding the right hand end of the member 40 against the latch member 32. Obviously, any tendency for the member 40 to be moved clockwise accidentally, would not result in an undesired operation of the valve inasmuch as it would merely position the elements of the valve to cause opening thereof. Such an unplanned operation of the valve would be immediately corrected by the presence of power in the transformer which causes the valve to automatically "recycle," that is, to return to the control of the thermostat.

Whenever the lever 19 moves in a clockwise direction, as viewed in Figure 1, either by the room thermostat becoming satisfied or the safety pilot switch opening due to pilot flame failure, or due to the manual tripping of the latch 32 by the member 40, the three-way valve will close the bleed line and open the supply line to the space above the diaphragm to cause the fuel pressure to close the diaphragm valve, all in a manner well known in the art.

While I have described the preferred embodiment of the invention above, which results in a very compact arrangement for a power and manually operated recycling mechanism for a valve, it is obvious that changes may be made therein without departing from the spirit of the invention. Therefore, it is to be understood that the scope of the invention is to be determined solely from the appended claims.

I claim as my invention:

1. A power operated valve comprising a valve, a pivoted lever, means coupling said lever to said valve for actuating said valve to open position upon movement of said lever in a valve opening direction, power means for actuating said lever through a given range of movement in said valve-opening direction to a second position, means biasing said lever in a valve closing direction, a pivoted latch positioned adjacent said lever, manually operable means pivoted and arranged to be rocked in one direction to engage and move said latch into engagement with said lever to thereby move said lever a distance less than said given range of movement in said valve-opening direction to a first position to open said valve, means on said lever engageable with said latch in its first position to prevent return movement of said latch and said valve upon release of said manually operable means, said manually operable means being movable in the opposite direction to engage and move said lever an additional distance in the valve-opening direction to move said lever from said first to said second position to release said latch from said lever.

2. In an automatically recycling diaphragm valve controlled by a relay-operated pilot valve, the combination comprising a pivoted lever, means connecting said lever to said pilot valve to actuate said pilot valve to open position upon said lever moving to a valve-open position in a valve opening direction, one end of said lever being engaged by said relay and biased toward valve closing position, a fixed contact, a latch carrying a movable contact and biased away from said fixed contact, and manually operable means pivoted adjacent said lever and latch and movable in one direction to engage said latch to cause movement of said latch against said lever to thereby move said lever in said valve opening direction to a first position and through said lever to move said movable contact into engagement with said fixed contact thereby completing a circuit to said relay and opening said pilot valve, said latch engaging said lever in said first position to prevent return movement thereof, said manually operable means being movable in the opposite direction to engage said lever to move it an additional distance in valve-opening direction from said first position to release said latch, said relay upon energization thereof also engaging said lever to move it said additional distance in valve-opening direction from said first position to release said latch.

3. A power operated valve comprising a valve, a pivoted lever, means coupling said lever to said valve so that movement of said lever in a valve-opening direction opens said valve, power means for actuating said lever to a second position in said valve opening direction, means biasing said lever in a valve-closing direction, a pivoted latch positioned adjacent said lever, manually operable means pivoted and arranged to be rocked in one direction to engage and move said latch into engagement with said lever to thereby move said lever in said valve opening direction to a first position to open said valve, a notch in said lever engageable with and exerting an axial thrust on the end of said latch in said first position to prevent return movement of said latch and said valve upon release of said manually operable means, said manually operable means being movable in the opposite direction to engage and move said lever an additional distance in the valve-opening direction to said second position to release said latch from said lever.

4. An automatically recycling diaphragm valve controlled by a relay-operated pilot valve comprising a pivoted lever, means coupling said lever to said pilot valve so that movement of said lever in a valve-opening direction actuates said pilot valve, one end of said lever being engaged by said relay and biased toward valve closing position, a fixed contact, a pivoted latch carrying a movable contact and extending substantially parallel to said lever and biased away from said fixed contact, and manually operable means pivoted adjacent said lever and latch and movable in one direction to engage said latch to cause movement of said latch against said lever to thereby move said lever in said valve opening direction to a first position and to in turn move said movable contact into engagement with said fixed contact to thus complete a circuit to said relay and to open said pilot valve, said latch engaging said lever in said first position to prevent return movement thereof, said manually operable means being movable in the opposite direction to engage said lever to move it an additional distance in valve-opening direction to a second position to release said latch, said relay when energized also engaging said lever to move it said additional distance in valve-opening direction to a second position to release said latch.

5. In a power operated valve, the combination comprising a pivoted lever, means coupling said lever to said valve to actuate said valve upon movement of said lever in a valve-opening direction, power means for actuating said lever to a second position in said valve-opening direction, means coupling said power means to said lever, means biasing said lever in a valve-closing direction, a pivoted latch substantially parallel to said lever, manually operable means pivoted and arranged to be rocked in one direction to engage and move said latch into engagement with said lever and thereby to move said lever to a first position in said valve-opening direction to open said valve, means on said lever engageable with said latch in said first position to prevent return movement of said latch and said valve upon release of said manually operable means, said manually operable means being movable in the opposite direction to engage and move said lever an additional distance in said valve-opening direction to said second position to release said latch from said lever.

6. In an automatically recycling diaphragm valve controlled by a relay operated pilot valve, the combination comprising a lever pivoted intermediate its ends with one end thereof having means coupled to said pilot valve for actuating said pilot valve upon movement of said lever in valve-opening direction, the other end of said lever having means engaged by said relay and biased toward valve closing position, a fixed contact, a latch carrying a movable contact and biased away from said fixed contact, and manually operable means pivoted adjacent said lever and latch and manually movable in one direction to engage said latch to thereby move said latch against said lever to cause movement of said lever in said valve opening direction to a first position to thereby open said pilot valve, said movement of said latch causing movement of said movable contact into engagement with said fixed contact to complete a circuit to said relay, said latch engaging said lever in said first position to prevent return movement thereof, said manually operable means being movable in the opposite direction to engage said lever to move said lever an additional distance in valve-opening direction to a second position to release said latch, said relay when energized engaging said lever to also move said lever an additional distance in valve-opening direction to release said latch.

7. The combination defined in claim 6 wherein the manually operable means comprises a half disc with a knurled arcuate edge.

8. A power operated valve comprising a valve, a pivoted lever, means coupling said lever to said valve to actuate said valve upon movement of said lever in a valve-opening direction, power means for actuating said lever to a second position in said valve-opening direction, means coupling said power means to said lever, means biasing said lever in a valve closing direction, a pivoted latch positioned adjacent said lever, manually operable pivoted means lightly biased in one direction against said latch and further movable in the same direction to engagement with said lever to thereby move said lever to a first position in said valve-opening direction to open said valve, means on said lever engageable with said latch in said first position to prevent return movement of said latch and said valve upon release of said manually operable pivoted means, said manually operable pivoted means being movable against its bias in the opposite direction to engage and move said lever an additional distance in said valve-opening direction to said second position to release said latch from said lever.

9. In an automatically recycling diaphragm valve controlled by a relay operated pilot valve, the combination comprising a pivoted lever, means coupling said lever to said pilot valve to actuate said pilot valve to open position upon movement of said lever in a valve-opening direction, one end of said lever being engaged by said relay and biased toward valve closing position, a fixed contact, a latch carrying a movable contact and biased away from said fixed contact, and a half disc pivoted adjacent said lever and latch with the flat portion thereof lying above portions of said latch and lever, said half disc being movable in one direction to engage said latch to cause movement of said latch against said lever to thereby move said lever to a first position in said valve opening direction to open said pilot valve and to thereby move said movable contact into engagement with said fixed contact to complete a circuit to said relay, said latch engaging said lever in said first position to prevent return movement thereof, said half disc being movable in the opposite direction to engage said lever to move it an additional distance in said valve-opening direction to a second position to release said latch, said relay when energized engaging said lever to move it an additional distance in said valve-opening direction to said second position to release said latch.

References Cited in the file of this patent

UNITED STATES PATENTS

| | | |
|---|---|---|
| 2,155,358 | Cyr | Apr. 18, 1939 |
| 2,269,016 | Gille | Jan. 6, 1942 |
| 2,622,622 | Ray | Dec. 23, 1952 |